(12) United States Patent
Hernandez

(10) Patent No.: US 8,458,921 B2
(45) Date of Patent: Jun. 11, 2013

(54) INSULATION WORK APPARATUS

(76) Inventor: Luis Hernandez, Odessa, TX (US)

( * ) Notice: Subject to any disclaimer, the term of this patent is extended or adjusted under 35 U.S.C. 154(b) by 164 days.

(21) Appl. No.: 13/080,182

(22) Filed: Apr. 5, 2011

(65) Prior Publication Data
US 2012/0255190 A1 Oct. 11, 2012

(51) Int. Cl.
*G01B 5/00* (2006.01)
(52) U.S. Cl.
USPC .......................................... 33/679.1; 33/494
(58) Field of Classification Search
USPC ................... 33/679.1, 483, 758, 759
See application file for complete search history.

(56) References Cited

U.S. PATENT DOCUMENTS

| | | | | |
|---|---|---|---|---|
| 1,196,519 A * | 8/1916 | Caylor | ............................. | 33/476 |
| 1,343,912 A * | 6/1920 | Funk | ............................... | 33/494 |
| 1,797,213 A * | 3/1931 | Marcum | ........................ | 33/499 |
| 3,144,716 A * | 8/1964 | Cich | ............................... | 33/486 |
| 3,673,689 A * | 7/1972 | Magnotto | ..................... | 33/471 |
| 4,149,320 A * | 4/1979 | Troyer et al. | ................... | 33/758 |
| 4,200,990 A * | 5/1980 | West | ............................... | 33/476 |
| 4,420,891 A * | 12/1983 | Orem | .............................. | 33/476 |
| 4,538,352 A * | 9/1985 | Frith | ............................... | 33/1 B |
| 4,941,264 A * | 7/1990 | Poirier | ........................... | 33/457 |
| 5,014,438 A * | 5/1991 | Gravel | ........................... | 33/494 |
| 5,020,233 A * | 6/1991 | Syken | ............................ | 33/465 |
| 5,208,992 A * | 5/1993 | Syken | ............................ | 33/472 |
| 5,505,002 A * | 4/1996 | Falco | ............................. | 33/501 |
| 5,627,763 A * | 5/1997 | Carlson | ........................... | 703/1 |
| 5,896,673 A * | 4/1999 | Kustor | ........................ | 33/679.1 |
| 7,082,692 B2 * | 8/2006 | Shapiro | .......................... | 33/473 |
| 7,533,473 B2 * | 5/2009 | Chua | .............................. | 33/758 |
| 7,631,439 B2 * | 12/2009 | Black | ............................. | 33/759 |
| 7,797,842 B2 * | 9/2010 | Fernandes | .................... | 33/27.03 |
| 7,891,106 B2 * | 2/2011 | Dunham | ........................ | 33/512 |
| 7,958,645 B1 * | 6/2011 | Chappell | ........................ | 33/476 |
| 2003/0126752 A1 * | 7/2003 | Brandon et al. | ................ | 33/494 |
| 2005/0223581 A1 * | 10/2005 | Hale | .............................. | 33/758 |
| 2006/0090360 A1 * | 5/2006 | Shapiro | .......................... | 33/473 |
| 2012/0110865 A1 * | 5/2012 | Vaught | ........................... | 33/431 |
| 2012/0255190 A1 * | 10/2012 | Hernandez | .................. | 33/679.1 |

\* cited by examiner

*Primary Examiner* — Yaritza Guadalupe-McCall
(74) *Attorney, Agent, or Firm* — Maier & Maier PLLC

(57) ABSTRACT

An insulation work tool is disclosed that is marked for measurement and comparison with charts thereon for different ratios and grades of pipes, clamps, and insulation as used in the insulation industry, and includes other devices for determination of the proper relationships of dimensions of the insulation, pipes, clamps, and sheet metal, as well as other functions.

4 Claims, 5 Drawing Sheets

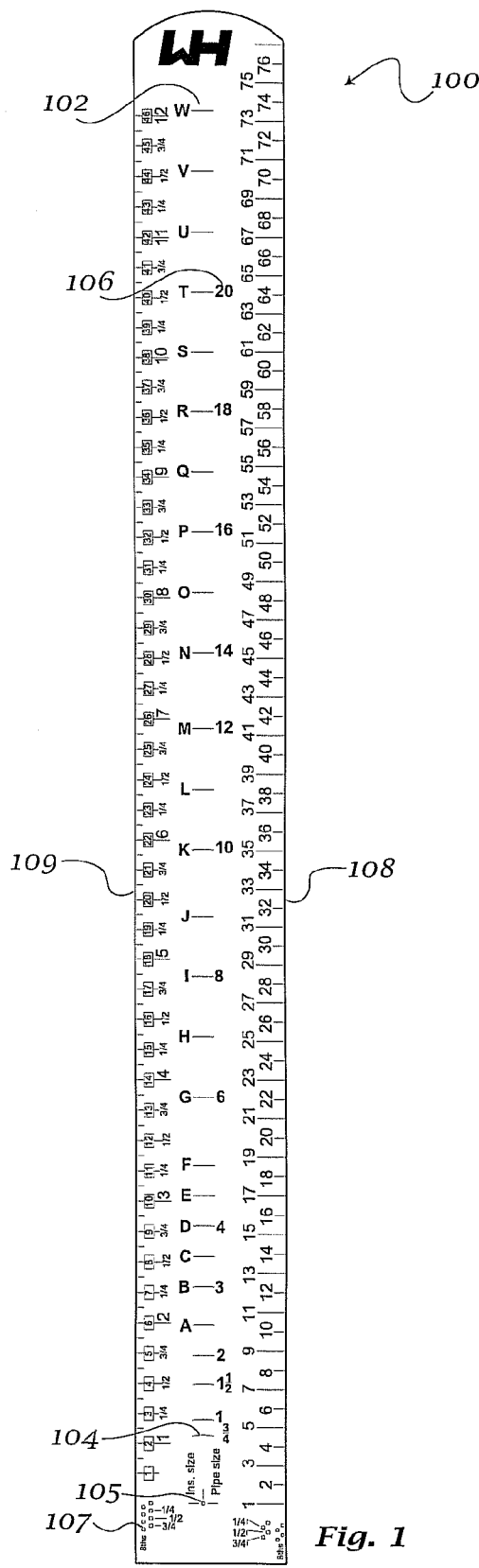

INSULATION WORK APPARATUS

BACKGROUND

Catalogues or rule books for calculating appropriate relationships among various components in construction are known in the art. Typically, such catalogues are printed in paper books or booklets and are used in conjunction with measurements made by other calculators. The insulation industry has a particular need for measuring and calculating relationships relating pipes, clamps, and insulation which have their own standards and labels. These measurements can be for various sizes of these items, not necessarily in standard units of measure, and often are utilized for measurements of pipes, the appropriate measurements of clamps, and thicknesses of insulation relative to and among each other.

While these various measurements can be calculated, it takes a significant amount of time on the job to make such calculations. Additionally, errors may be made in the calculations. Consulting catalogues can cause an unnecessary waste of time and limit overall productivity, as does having to work back and forth between consulting catalogues and utilizing separate measuring devices.

SUMMARY

A work tool approximately one foot in length is disclosed that is marked for measurement and comparison with charts thereon for different ratios and grades of pipes, clamps, and insulation as used in the insulation industry, and including charts as well for determination of the proper relationships of dimensions of the insulation, pipes, clamps, and sheet metal, as well as other information, as well a being able to function as a convenient measuring device.

According to another exemplary embodiment, a similar but larger work tool approximately two feet in length is disclosed for measuring and comparing larger dimensions of the different measures and functions involved. This larger tool comprises two segments with a pivoted connection at the end of each, so that when opened the segments are aligned with each other so as to provide a continuous measure of the different comparisons up to and including the larger distances involved. The pivot is provided so that this larger tool may be folded upon itself for ease of carrying. It also performs other functions.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 1 shows an exemplary front view of a work tool.

FIG. 2 shows an exemplary rear view of the work tool of FIG. 1.

DETAILED DESCRIPTION

Figure 3:
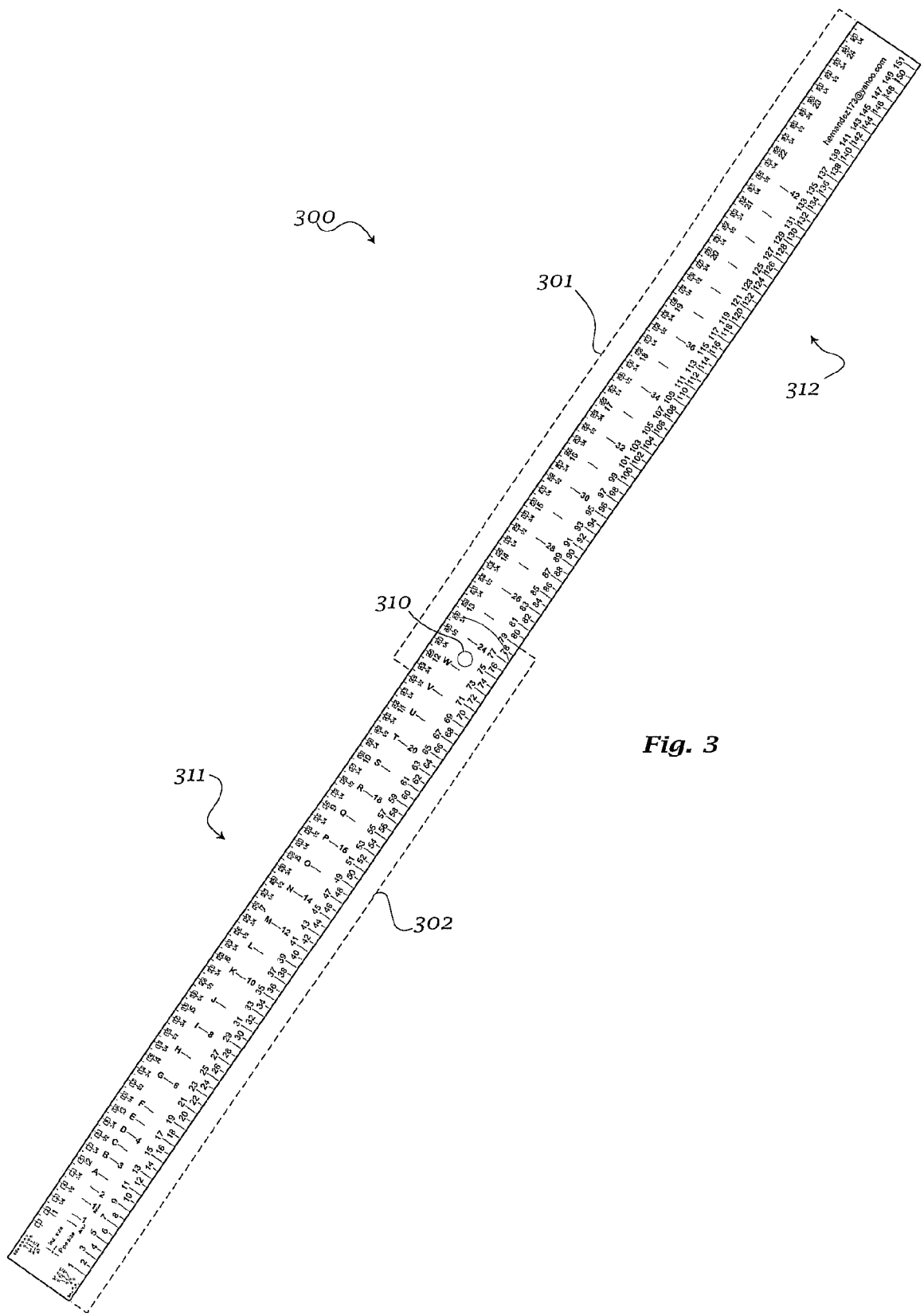
FIG. 3 shows an exemplary view of another work tool.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

FIG. 1 shows an exemplary embodiment of a work tool 100. Work tool 100 may be about one foot in length and may be formed out of any rigid or semi-rigid material, for example wood, metal, plastic, any combination thereof or any other material as desired. A front portion FIG. 1 of the work tool 100 may have any desired units of measurement disposed thereon, for example regular numbered inches. The units of measurement are to scale, so that, for example, regular numbered inches on the front left portion may be conveniently be used for measurement of elements such as pipe diameter so that such measurements may then be employed in conjunction with calculation features of the work tool. Holes 107 may be positioned at a bottom portion and may act as, for example, center points for a compass or divider. Such center points on a compass or divider may be used to pick out a fraction where the other end is a whole number. This can allow for tool 100 to be used in a process for cutting a circumference into four equal parts in certain patterns.

Letters A-W in exemplary FIG. 1 may be indicated as at 102. These letters can indicate distances as measured from the lines 104 extending from letters 102 to the hole 105 at a center bottom of the tool 100. In one exemplary embodiment, the lines 104 may be slightly curved, for example as seen with the smaller distances, so as to facilitate a measurement by a compass or divider. The letters 102 can indicate an insulation thickness size in an exemplary embodiment. Additionally, the letters 102 can refer to a chart 203 on an upper portion of the back side 200 (as shown in exemplary FIG. 2) of work tool 100 as correlation indicators to certain thicknesses of standard insulation that may be used with certain thicknesses of pipe. Additionally, at an end of lines 104 there may be indicated numbers 106. Numbers 106 can refer to pipe sizes. These pipe sizes may also, with the lines 104, be measured from center hole 105, and may be used with certain patterns. Thus, the use of work tool 100 may provide for rapid calculations and measurement.

A right side 108 of the front of the work tool 100, as shown in FIG. 1, can be ruled with certain numbers. The numbers, in one exemplary embodiment, can refer to a circumference, in inches, or any desired unit of measurement, of a pipe with a radius that may be at listed on the left side 109, and which may be multiplied by 2 pi, or a factor of about 6.28.

In another exemplary embodiment, and now referring to FIG. 2, the letters 102, shown as elements 209 in FIG. 2, may also refer to chart 207 at a bottom back part of the work tool 100, further described below.

As may be seen in exemplary FIG. 2, chart 207 can refer to the letters 102, there-identified at 209. Chart 207 can also list values for bands 208 and sheet metal 201, as well as a close measurement of the circumference 202 of the insulation listed in the top chart 203. The sheet metal value 201 and circumference value 202 may be standard increments for lap on the sheet metal and bands. In still other exemplary embodiments, any values or correlations described herein may be utilized in any other desired measurements or calculations.

Figure 4:
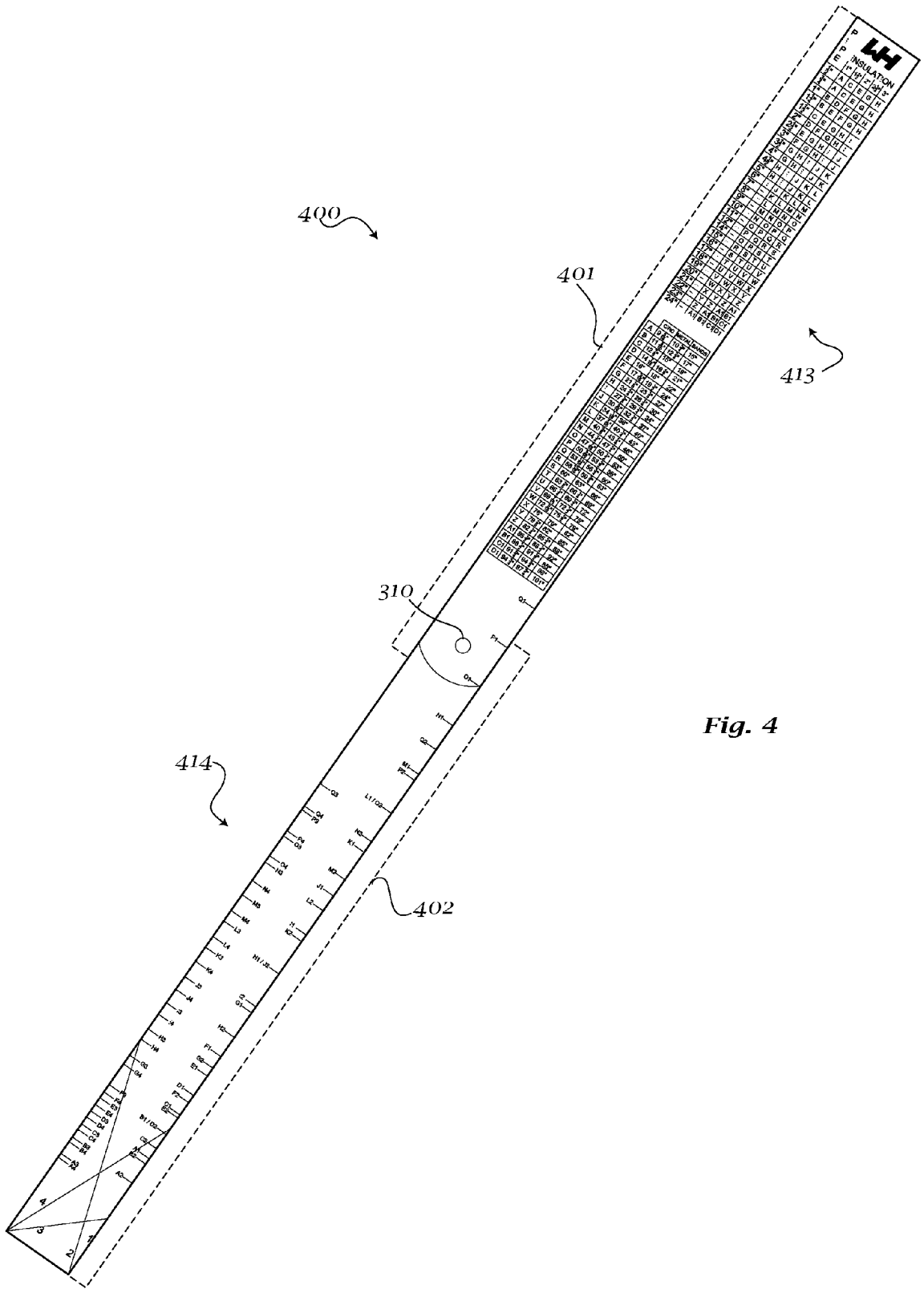
FIG. 4 shows an exemplary rear view of the work tool of FIG. 3.

Exemplary FIGS. 3 and 4 can refer to another embodiment of a work tool, for example one being about two feet in length. This exemplary embodiment may similar to the embodiment of the one-foot work tool described in the exemplary embodiments referred to in FIGS. 1 and 2. Exemplary FIGS. 3 and 4 can show a front of work tool 300 and back 400 of work tool 300. Work tool 300 can further have two rectangular flat elements 301, 401 and 302, 402, that may be pivoted at a mechanical pivot 310. Mechanical pivot 310 may allow the work tool 300 to fold and decrease the effective length, for example to reduce the carrying size or increase the convenience of handling work tool 300. Other exemplary manners of reducing the length of work tool 300, for example sliding portions 301/302 and 401/402 together and locking them in place, may also be contemplated and utilized, as desired. Further, on the front face 302 shown in exemplary FIG. 3, the lower segment 311 may be substantially similar to the front face 100 of the one-foot work tool of FIG. 1. The upper segment 301 may further be an extension of the lower segment 311 for larger distances, and can operate similarly.

Referring now to exemplary FIG. 4, the back face 400 at the upper segment 413 can have the same or similar charts as those which appeared on the back face 200 of the work tool shown in exemplary FIG. 2. For example similar numbering can be utilized, albeit on a larger scale, depending on the length of work tool 300. Additionally, in this exemplary embodiment the charts may not be located on the back face 414 of the lower segment 402. However, if desired, charts may be provided there or any other desired information may be disposed in that location.

Figure 5:
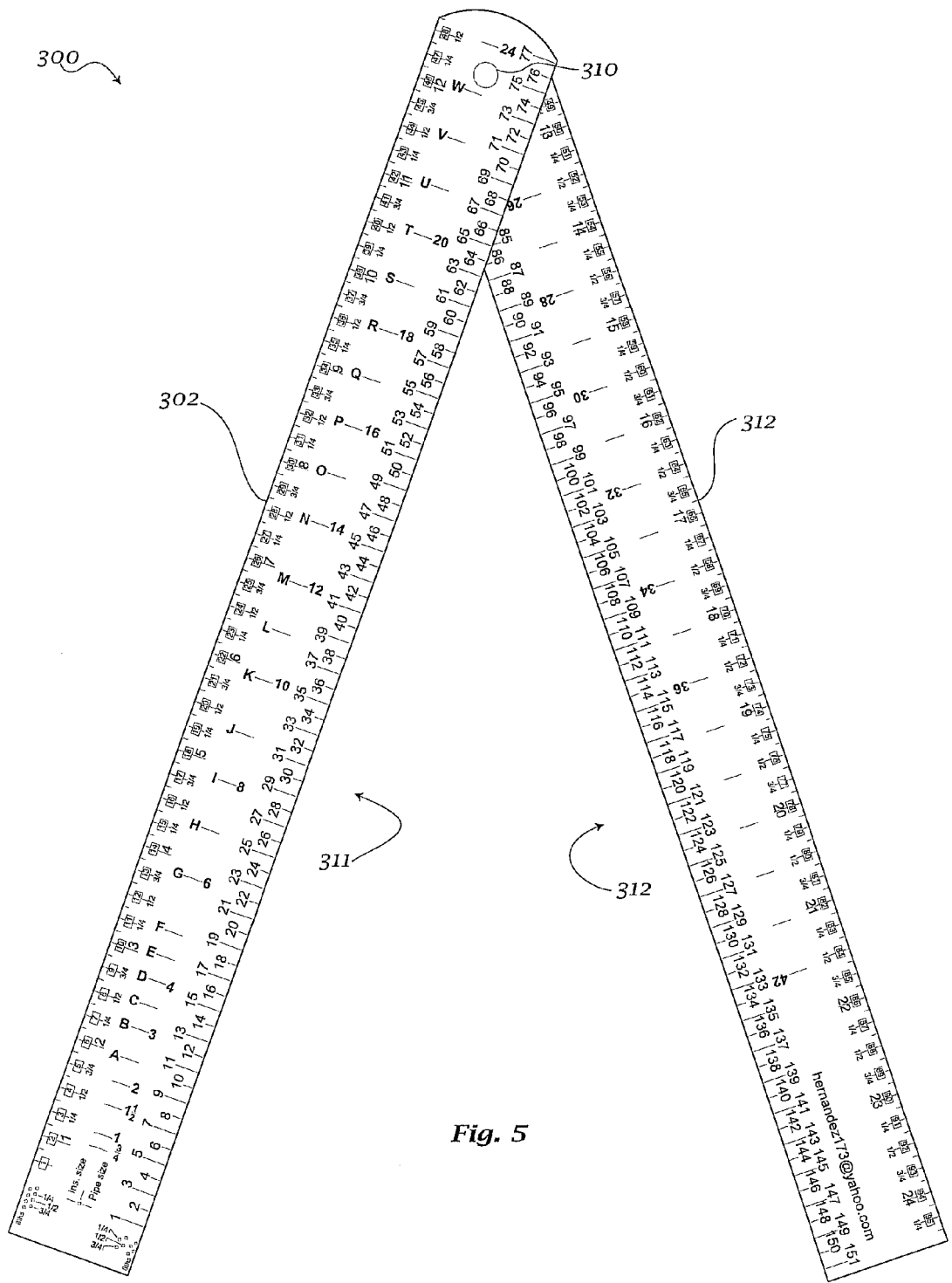
FIG. 5 is an expanded view of a section of the work tool of FIG. 3.
Figure 6:
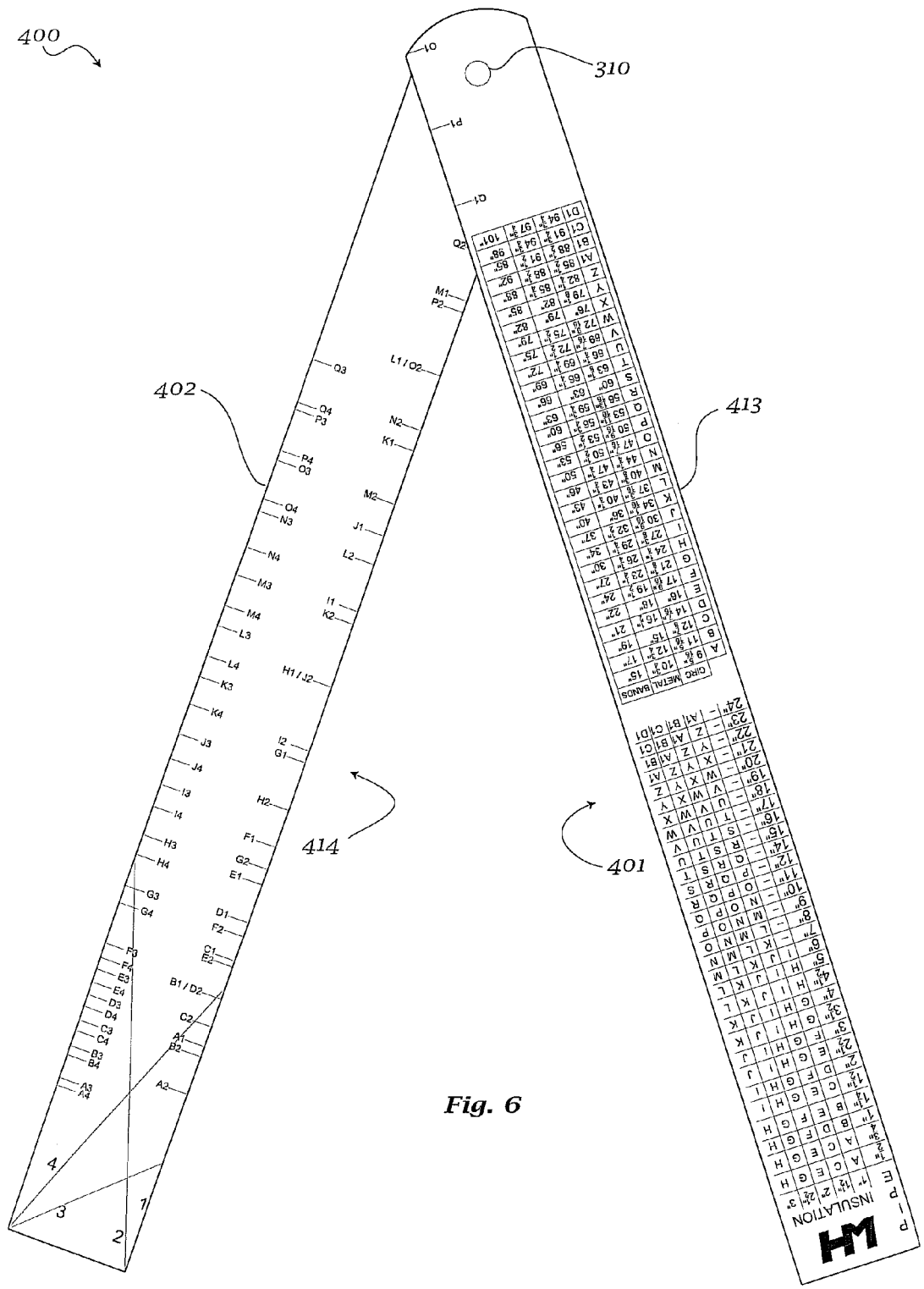
FIG. 6 is an expanded view of a section of the work tool of FIG. 4.

Still referring to exemplary FIG. 4, the bottom segment 414 of the tool 300, as well as a small portion of the bottom portion of the top segment 413, can have four different, or any other desired number, of measurements. For example, each letter may have a number that indicates order. These can be pre-measurements of a "TEE", or cross pattern. These elements may be further shown in exemplary FIGS. 5 and 6. Exemplary FIGS. 5 and 6 can show the work tool 300 in a partially folded position, for example folded around mechanical pivot 310. Additionally, exemplary values for the units and measurements described herein may be shown in greater detail.

The foregoing description and accompanying figures illustrate the principles, preferred embodiments and modes of operation of the invention. However, the invention should not be construed as being limited to the particular embodiments discussed above. Additional variants of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An insulation work tool comprising:
    a rigid, substantially rectangular tool having a front side and a back side;
    a first indicia on the front side of the tool indicating distances as measured from a first side of a plurality of lines extending from the plurality of lines to a point at the end of the tool, the first indicia referencing a first chart on the back side of the tool, the chart providing a plurality of correlating indicators of the first indicia with respect to a thicknesses of standard insulation that is appropriate for use with certain thicknesses of pipe;
    a second indicia at a second end of the plurality of lines that refers to pipe sizes as measured from one of the plurality of lines to the point and used with at least one desired pattern;
    a second chart disposed on the back side of the tool that includes the first indicia and correlates the first indicia to at least one of dimensions of bands, sheet metal, and circumference of insulation listed in the first chart; and,
    an elongate flat extension, the elongate flat extension having parallel front and back sides, the elongate flat extension being mechanically pivoted at its end with the end of the work tool, the elongate flat extension further comprising:
        an extension of the first indicia, the second indicia, the plurality of lines and distances so as to extend the range of measurements covered by the first and second indicia;
        a third chart with at least four different measurements for each of the first indicia, each said first indicia having a number indicating the order, said first indicia and number being pre-measurements of a tee pattern; and
        a correlation index correlating common sizes of pipe radii with corresponding circumferences.

2. The insulation work tool of claim 1, further comprising: a mechanical pivot disposed through a substantially central portion of the tool.

3. The insulation work tool of claim 2, wherein the mechanical pivot allows the tool to be folded.

4. The insulation work tool of claim 1, wherein the first indicia has standard units of measurement to scale so as to facilitate the first indicia being used as a convenient measurement device.

* * * * *